United States Patent
Kiuchi et al.

(10) Patent No.: US 7,466,086 B2
(45) Date of Patent: Dec. 16, 2008

(54) MOTOR DRIVE UNIT

(75) Inventors: Mitsuyuki Kiuchi, Nara (JP); Sadayuki Tamae, Osaka (JP); Hisashi Hagiwara, Osaka (JP); Masahiro Suzuki, Osaka (JP); Shuichi Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 231 days.

(21) Appl. No.: 11/485,025

(22) Filed: Jul. 12, 2006

(65) Prior Publication Data

US 2007/0013325 A1 Jan. 18, 2007

(30) Foreign Application Priority Data

Jul. 13, 2005 (JP) .............................. 2005-204160

(51) Int. Cl.
*H02P 5/00* (2006.01)

(52) U.S. Cl. ...................... 318/41; 318/52; 318/400.07; 363/87

(58) Field of Classification Search .................. 318/34, 318/41, 52, 139, 254, 636, 801, 78, 400.07; 363/87

See application file for complete search history.

(56) References Cited

U.S. PATENT DOCUMENTS

| | | | | |
|---|---|---|---|---|
| 5,661,378 A * | 8/1997 | Hapeman | ..................... | 318/52 |
| 6,023,137 A * | 2/2000 | Kumar et al. | .......... | 318/400.27 |
| 6,060,859 A * | 5/2000 | Jonokuchi | .................... | 318/801 |
| 6,075,717 A * | 6/2000 | Kumar et al. | .................. | 363/87 |
| 6,331,365 B1 * | 12/2001 | King | .............................. | 429/9 |
| 6,384,567 B1 * | 5/2002 | Maeda | ........................ | 318/801 |
| 6,577,087 B2 * | 6/2003 | Su | ........................ | 318/400.07 |
| 6,864,646 B2 * | 3/2005 | Rahman et al. | ................ | 318/41 |
| 7,049,784 B2 * | 5/2006 | Suzuki | ........................ | 318/636 |
| 7,304,444 B2 * | 12/2007 | Takano et al. | ................... | 318/34 |
| 2001/0035049 A1 * | 11/2001 | Balch et al. | .................... | 73/488 |
| 2004/0160201 A1 * | 8/2004 | Rahman et al. | ................ | 318/41 |
| 2004/0207349 A1 * | 10/2004 | Suzuki | ........................ | 318/254 |

FOREIGN PATENT DOCUMENTS

JP 2002-165476 A 6/2002

* cited by examiner

*Primary Examiner*—Paul Ip
(74) *Attorney, Agent, or Firm*—RatnerPrestia (57) ABSTRACT

A motor drive unit comprises a DC power source, a plurality of inverter circuits for converting the a power of this DC power source to an AC power, current detectors for detecting an output current of at least one of those plurality of inverter circuits and a controller for performing PWM control of those plurality of inverter circuits. This controller is constructed in a way to synchronize a PWM period of the plurality of inverter circuits, so as to drive a plurality of motors at once by means of those plurality of inverter circuits respectively.

9 Claims, 12 Drawing Sheets

MOTOR DRIVE UNIT

FIELD OF THE INVENTION

The present invention relates to a motor drive unit for driving a plurality of motors at once by means of a plurality of inverter circuits.

BACKGROUND OF THE INVENTION

Conventionally, in this type of motor drive unit for driving a plurality of motors at once, it was a normal practice to control a plurality of inverter circuits and a plurality of motors separately from one another. For example, such unit is disclosed in Japanese Laid-Open Patent Application No. 2002-165476.

This motor drive unit of conventional system, in which the period of pulse width modulation (hereinafter abbreviated as PWM) of a plurality of inverter circuits is controlled independently of one another and the motor current detecting timings are different, had such problems as large motor current detecting error due to switching noise of the inverter circuits, difficulty of a wide range of vector control or of estimation of rotor position by detection of current.

SUMMARY OF THE INVENTION

The motor drive unit according to the present invention comprises a DC power source, a plurality of inverter circuits for converting DC power of this DC power source to AC power, a current detector for detecting an output current of at least one of those plurality of inverter circuits, and a controller for performing PWM control of those plurality of inverter circuits. This controller is constructed in a way to synchronize a PWM period of the plurality of inverter circuits, so as to drive a plurality of motors at once by means of those plurality of inverter circuits respectively. By virtue of this configuration, it becomes possible to detect the current during an ON period or OFF period when no switching noise of any transistor in a plurality of inverter circuits is produced, and this enables to eliminate switching noise interference during a detection of current, improve the accuracy of detection of current, and thus realize a motor drive unit of low cost, high performance and high efficiency. Furthermore, it also enables to perform detection of current with an inexpensive shunt resistors system, and estimate a rotor position by detection of current accurately, to provide a highly reliable motor drive unit.

DETAILED DESCRIPTION OF PREFERRED EMBODIMENTS

Preferred embodiments of the present invention will be explained below with reference to drawings.

Preferred Embodiment 1

Figure 1:
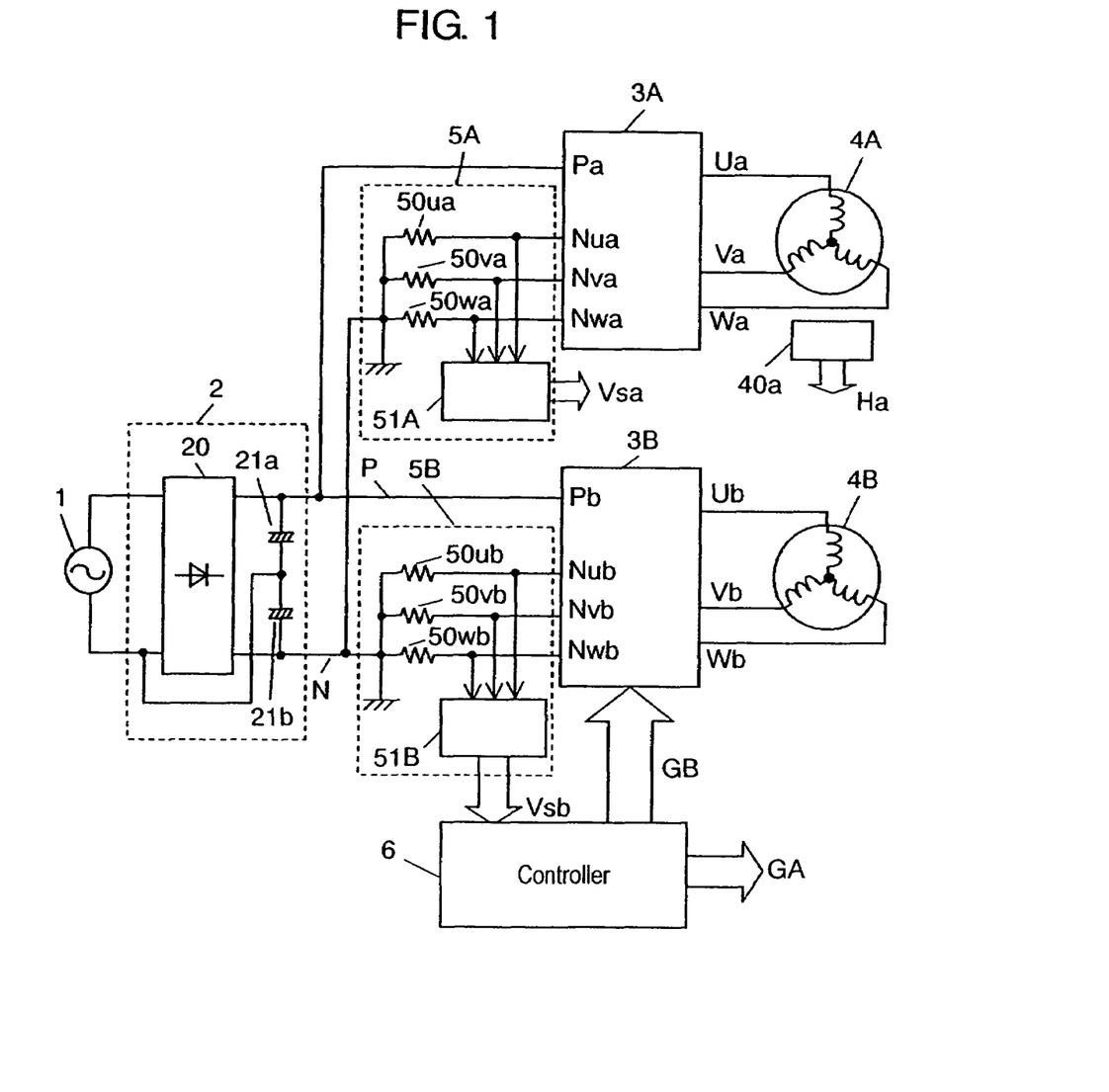
FIG. 1 is a block diagram of a motor drive unit in a preferred embodiment 1 of the present invention.

FIG. 1 indicates a block diagram of the motor drive unit in the preferred embodiment 1 of the present invention. In FIG. 1, AC power is applied from AC power source 1 to DC power source 2 constituted of full-wave rectification circuit 20 and electrolytic capacitors 21a, 21b for conversion into DC power, and the DC power is converted by inverter circuits 3A, 3B into 3-phase AC power to drive motors 4A, 4B. Current detectors 5A, 5B are connected to the negative voltage terminal side of inverter circuits 3A, 3B for detecting the electric current flowing through the respective 3-phase lower arms of inverter circuits 3A, 3B, to thereby detect the output current of inverter circuits 3A, 3B, i.e. electric current in the respective phases of motors 4A, 4B.

Controller 6, composed of a high-speed processor such as microcomputer having a plurality of PWM controllers for performing PWM control of inverter circuits 3A, 3B, or digital signal processor (abbreviated as DSP), etc., controls first inverter circuit 3A and second inverter circuit 3B at once, to control first motor 4A and second motor 4B at rotational speeds different from each other.

First inverter circuit 3A, intended for performing vector control of first motor 4A, detects the position of permanent magnet of the rotor with position sensor 40a of first motor 4A, detects the phase current of first motor 4A with first current detector 5A, and performs coordinate transformation (d-q conversion) into a vector in the direction of q-axis orthogonal to the direction of d-axis of the permanent magnet of the rotor for making vector control.

Second inverter circuit 3B, intended for performing Position Sensorless Control of second motor 4B, performs current control by flowing a sinusoidal wave current to second motor 4B, or controls by detecting the voltage applied to the motor or the current phase against a fictitious rotor position. Current detector 5A, of so-called 3-shunts system, is composed of shunt resistors 50ua, 50va, 50wa connected to emitter terminals Nua, Nva, Nwa of the respective lower arm transistors of first inverter circuit 3A, and level shift circuit 51A. Level shift circuit 51A detects the current flowing into each of shunt resistors 50ua, 50va, 50wa, and shifts the level, or performs amplification for level shift, of that current to a positive DC voltage level which can be detected by the analog/digital converter (hereinafter referred to as A/D converter) embedded in the processor of controller 6. This output signal Vsa is connected to the input terminal of the A/D converter of controller 6. Current detector 5B is composed of shunt resistors 50ub, 50vb, 50wb connected to emitter terminals Nub, Nvb, Nwb of the respective lower arm transistors of second inverter circuit 3B, and level shift circuit 51B, and its output signal Vsb is input in the A/D converter of controller 6.

Figure 2:
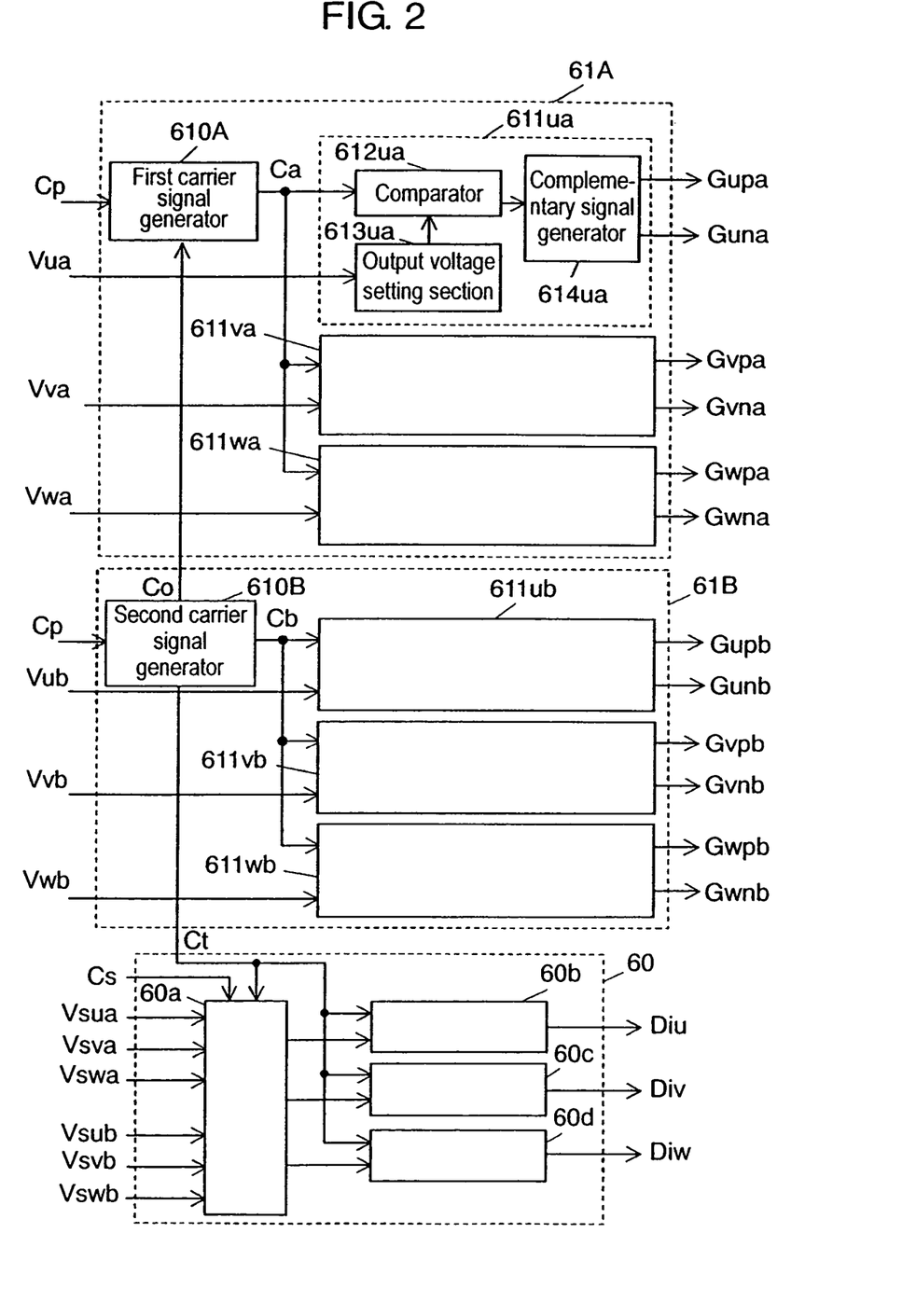
FIG. 2 is a block diagram of a A/D converter block and a PWM control block of a controller in the motor drive unit in above.

FIG. 2 is a block diagram of A/D converter block 60 and PWM control blocks 61A, 61B of controller 6. A/D converter block 60 is composed of multiplexer 60a for selectively outputting analog output signals Vsa, Vsb of current detectors 5A, 5B, and a plurality of A/D conversion circuits 60b, 60c, 60d for converting analog signals to digital signals at high speed. Multiplexer 60a selectively outputs output signals Vsua, Vsva, Vswa of current detector 5A of first inverter circuit 3A to A/D conversion circuits 60b, 60c, 60d by means of A/D conversion starting signal Ct and, after A/D conversion, multiplexer 60a selectively outputs output signals Vsub, Vsvb, Vswb of current detector 5B of second inverter circuit 3B to A/D conversion circuits 60b, 60c, 60d, for A/D conversion, thus enabling to detect the output current of a plurality of inverter circuits in several microseconds. Sign Cs in FIG. 2 represents an input selection signal of multiplexer 60a.

First PWM control block 61A, for controlling first inverter circuit 3A, is composed of first carrier signal generator 610A for generating triangular wave or saw-tooth wave signals, U-phase PWM circuit 611ua, V-phase PWM circuit 611va, and W-phase PWM circuit 611wa. U-phase PWM circuit 611ua is composed of comparator 612ua, output voltage setting section 613ua and complementary signal generator 614ua. Comparator 612ua compares output signal Ca of carrier signal generator 610A with the output signal of output voltage setting section 613ua to generate PWM signal. Complementary signal generator 614ua performs processing of wave shape forming such as insertion of inversion signal and dead time, etc., and outputs U-phase upper arm control signal Gupa, and U-phase lower arm control signal Guna. Explanation on V-phase PWM circuit 611va and W-phase PWM circuit 611wa will be omitted because their operations are similar to those of U-phase PWM circuit 611ua.

Second PWM control block 61B, for controlling second inverter circuit 3B, is composed of second carrier signal generator 610B for generating triangular wave or saw-tooth wave signals, U-phase PWM circuit 611ub, V-phase PWM circuit 611vb, and W-phase PWM circuit 611wb. Explanation on second PWM control block 61B will be omitted because its operations are similar to those of first PWM control block 61A described above.

Because synchronization between first PWM control block 61A and second PWM control block 61B can be secured by synchronizing first carrier signal generator 610A with second carrier signal generator 610B, one may obtain one same waveform with one same period by equalizing clock pulse Cp of carrier signal generators 610A, 610B, and setting one same value for the initial value and overflow (or underflow) of the timer counter. For example, by transferring initial value Co of the timer counter of carrier signal generator 610B to carrier signal generator 610A, and adding A/D conversion start signal Ct from carrier signal generator 610B to A/D converter block 60, it becomes possible to equalize the PWM period of first inverter circuit 3A and second inverter circuit 3B, to detect the current with current detectors 5A, 5B without switching noise interference.

Figure 3:
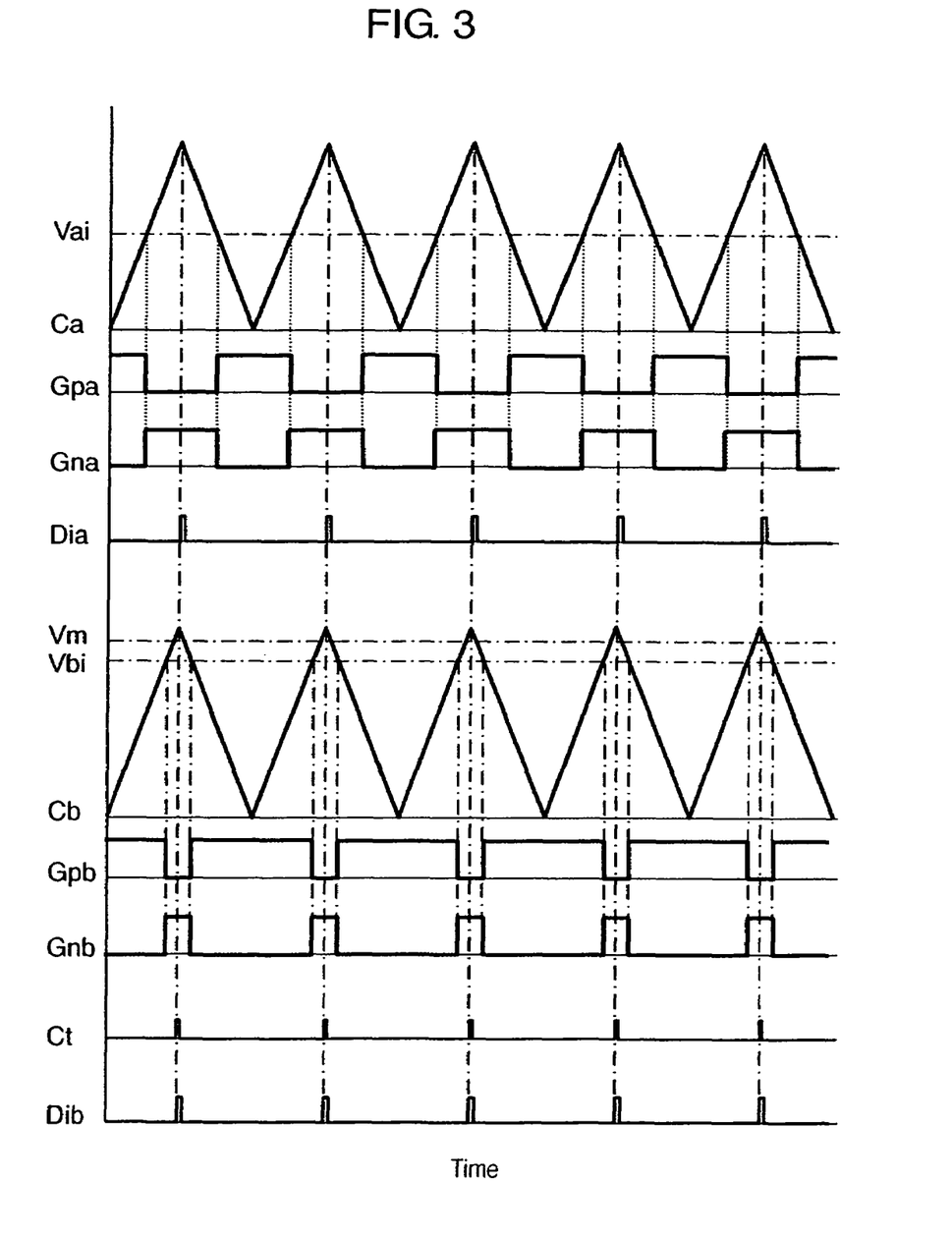
FIG. 3 is a timing chart of PWM period and current detection timing of the respective inverter circuits of the motor drive unit in above.

FIG. 3 indicates a timing chart of PWM period and current detection timing of the respective inverter circuits in the preferred embodiment 1. In FIG. 3, the PWM period and the current detection timing of the respective inverter circuits are of one same timing, showing the waveform in each of A/D converter block 60, first PWM control block 61A and second PWM control block 61B.

The waveform signals of the respective blocks correspond to the signals indicated in the block diagram of A/D converter block 60 and PWM control blocks 61A, 61B as shown in FIG. 2. Carrier signal waveforms Ca, Cb indicate triangular wave, but are basically the same even with saw-tooth wave. Sign Vai is an instantaneous output setting signal of output voltage setting section 613ua, while sign Vbi is an instantaneous output setting signal of output voltage setting section 613ub. As Vai gets larger the PWM duty of upper arm control signal Gpa increases, the PWM duty of lower arm control signal Gna decreases, and the inverter output voltage goes up. Sign Ct is an A/D conversion starting signal synchronizing with carrier signal, and Dia is a timing period for performing A/D conversion of output current signal of first inverter circuit 3A, while Dib is a timing period for performing A/D conversion of output current signal of second inverter circuit 3B, and A/D conversion is made without fail while the lower arm transistor is ON. Sign Vm is an output voltage limit setting signal, which is set for preventing switching of transistor during a period of A/D conversion as described in detail later, limits the minimum pulse width of lower arm control signal Gnb.

In FIG. 3, A/D conversion starting signal Ct is output only once at the timing of a peak of triangular wave carrier signals Ca, Cb. In reality, however, multiplexer 60a selectively outputs output signals Vsua, Vsva, Vswa of current detector 5A of first inverter circuit 3A to A/D conversion circuits 60b, 60c, 60d, and performs A/D conversion with first A/D conversion starting signal Ct, and then multiplexer 60a selectively outputs output signals Vsub, Vsvb, Vswb of current detector 5B of second inverter circuit 3B to A/D conversion circuits 60b, 60c, 60d, and performs A/D conversion with second A/D conversion starting signal Ct. In the case where there are no less than 2 units of A/D conversion circuits as shown in FIG. 2, it is possible to detect the output current of a plurality of inverter circuits about simultaneously in one carrier, by continuously executing A/D converting operations in linkage with multiplexer 60a.

Figure 4:
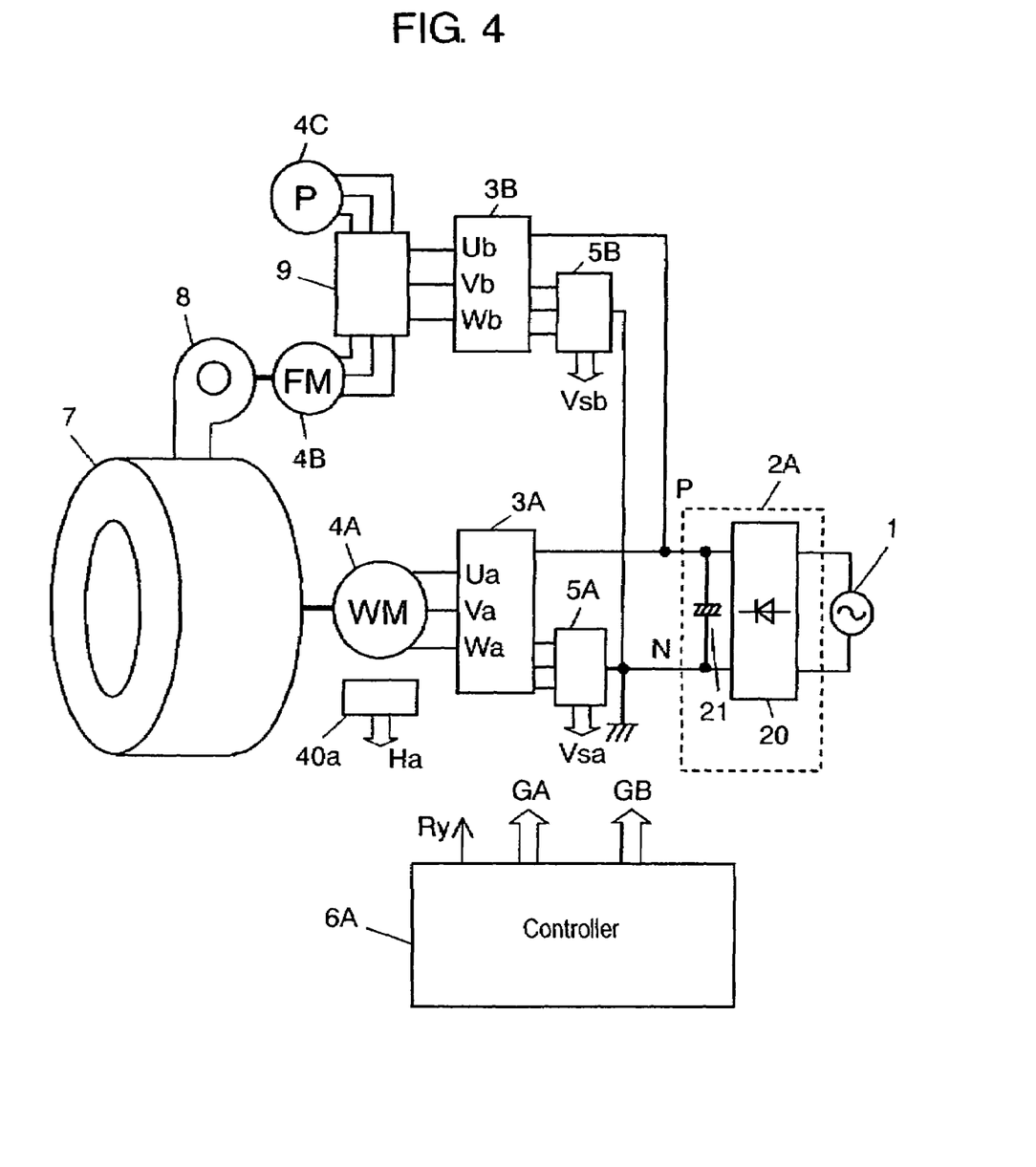
FIG. 4 is a block diagram of a drum type washer-dryer using the motor drive unit in above.

FIG. 4 is a block diagram of a drum type washer-dryer using the motor drive unit in the preferred embodiment 1.

In FIG. 4, first inverter circuit 3A is connected to the output side of one DC power source 2A, to detect the motor current of main motor 4A with first current detecting block 5A, detect the rotor position of main motor 4A with position sensor 40a, and perform vector control of main motor 4A with controller 6A, to thereby rotate washing & spinning drum 7.

Similarly, second inverter circuit 3B is connected to the output side of one DC power source 2A, to detect the motor current of motor 4B with second current detecting block 5B, and perform Sensorless sinusoidal wave control of motor 4B with second inverter circuit 3B and controller 6A, to thereby rotate drying fan 8. Moreover, switching block 9 is provided on the output terminal side of second inverter circuit 3B, to switch the output of second inverter circuit 3B in the draining process with switching signal Ry, to thereby drive drain pump motor 4C in place of drying fan 8. In Japan, where bath water supply pump is used more frequently than drain pump, it may be all right to connect a bath water supply pump instead of a drying fan, and drive the bath water supply pump in the water feed process.

Furthermore, for the purpose of reducing motor vibration noise, the carrier frequency of inverter circuits 3A, 3B is set for an ultrasonic frequency of 15 kHz or over respectively, to synchronize the PWM period of inverter circuits 3A, 3B, as shown in FIG. 4, detect the respective motor currents alternately in each carrier, and execute the detection of motor current and the vector operations such as 3-phase/2-phase conversion, coordinate transformation, q-axis current, d-axis current detection, inverse transformation, etc., to thereby reduce the task volume of motor control, thus reducing the burden of the processor.

Position sensor 40a of main motor 4A outputs signals at each 60 degree of electric angle and q-axis (or d-axis) signal of the rotor, to use it as reference time signal for coordinate transformation.

Figure 5:
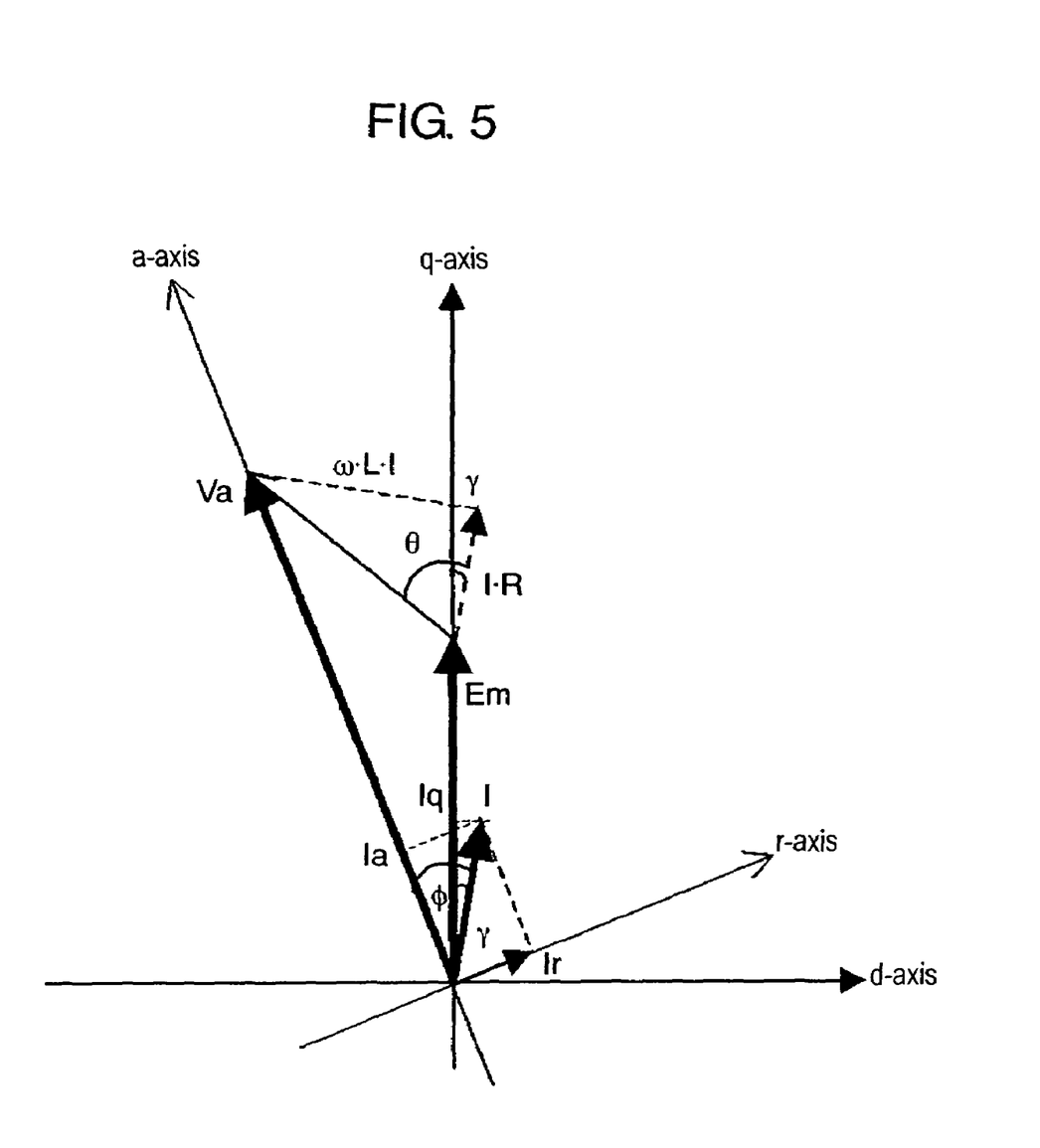
FIG. 5 is a control vector diagram of a Sensorless sinusoidal wave drive system in the motor drive unit in above.

FIG. 5 indicates a control vector diagram of Sensorless sinusoidal wave drive system in this preferred embodiment.

The control system of motor 4B is a system which consists in performing position Sensorless sinusoidal wave drive with reactive current constant control method for improving reliability by eliminating rotor position sensor to adopt an inexpensive motor. The position Sensorless sinusoidal wave drive system in this preferred embodiment, which consists in detecting the inverter output current at each carrier signal and performs coordinate transformation into inverter output voltage Va-axis, decomposing it into active current component Ia with a vector in the same direction as that of the inverter output voltage axis (a-axis) and reactive current component Ir of the reactive voltage axis (r-axis) in the direction orthogonal to the inverter output voltage axis (a-axis), and performing proportional integral control of applied voltage Va so that reactive current component Ir may come to predetermined value Irs, is a constant rotational speed control in which the ratio of drive frequency to applied voltage becomes about constant, showing operating characteristics similar to those of V/f control.

Reactive current constant control method, in which load angle δ (phase of Back emf Em and applied voltage Va) and current phase φ of motor current I and applied voltage Va automatically change even with fluctuations of load torque, enables to drive a motor at a constant frequency. Namely, no special control against fluctuations of torque is required, because, as the torque decreases, load angle δ becomes smaller, current phased φ comes close to 90 degree and phase γ of motor current I and q-axis becomes larger. Moreover, by detecting active current Ia, it becomes possible to detect the load torque, thus enabling to detect completion of drainage of drain pump or detect aeration.

As described above, main motor 4A for driving washing spinning drum 7 is submitted to vector control, and this facilitates phase control from q-axis, and also facilitates torque control and detection of fluctuations of torque due to unbalance of clothes. Furthermore, with vector control, advance angle control becomes easier by simply increasing the d-axis current, and advance angle control during a spinning operation facilitates high-speed operation. Still more, because the drive of drying fan motor 4B or drain pump motor 4C is Sensorless sinusoidal wave drive by constant reactive current control, an inexpensive motor eliminating position sensor can be adopted, thus enabling to reduce the motor vibration noise. Yet more, constant reactive current control has a characteristic of facilitating detection of load because active current Ia decreases as the motor load diminishes, thus enabling detection of completion of drainage or detection of completion of bath water feed in the bath water pump.

Preferred Embodiment 2

Figure 6:
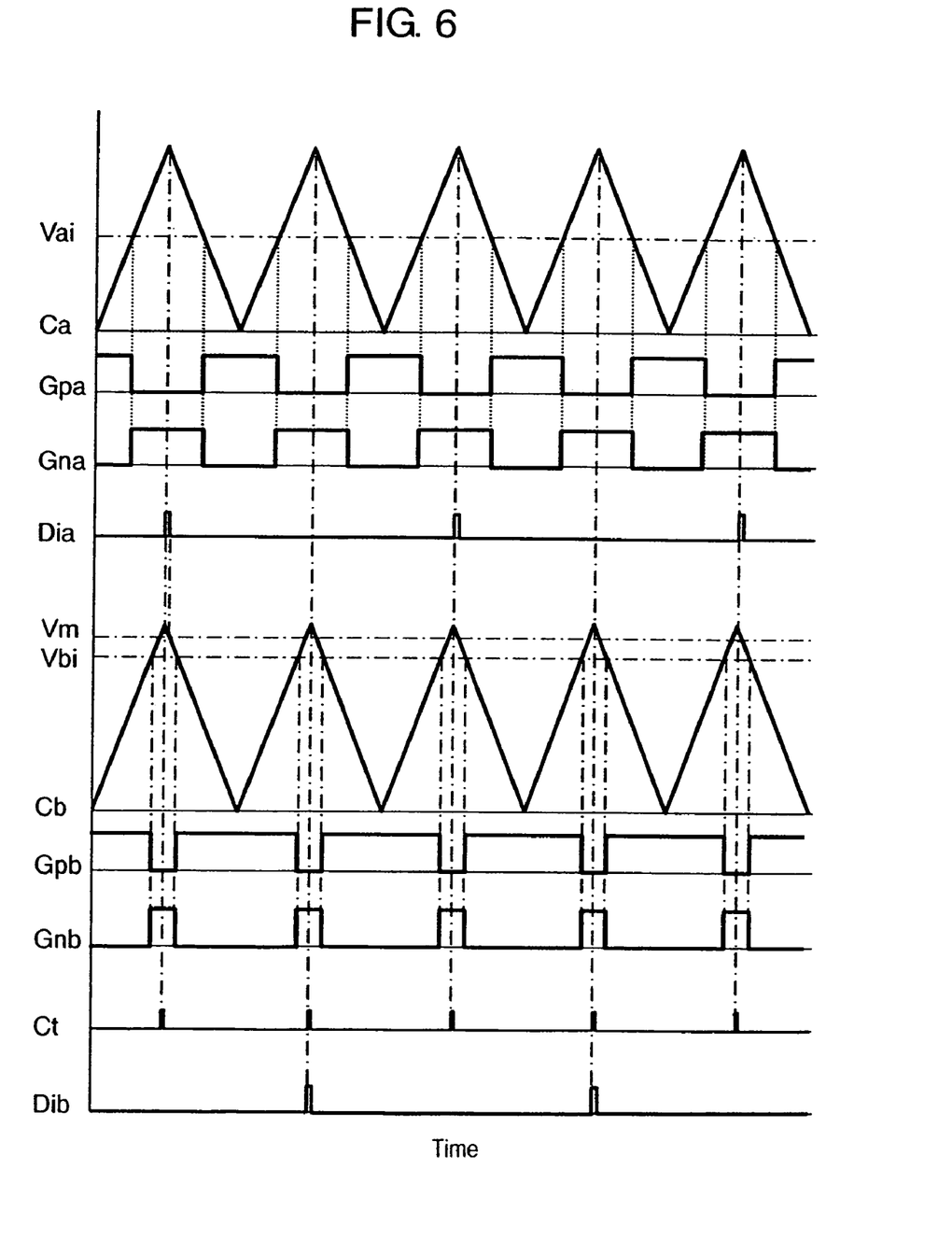
FIG. 6 is a timing chart of PWM period and current detection timing of the respective inverter circuits of a motor drive unit in a preferred embodiment 2 of the present invention.
Figure 7:
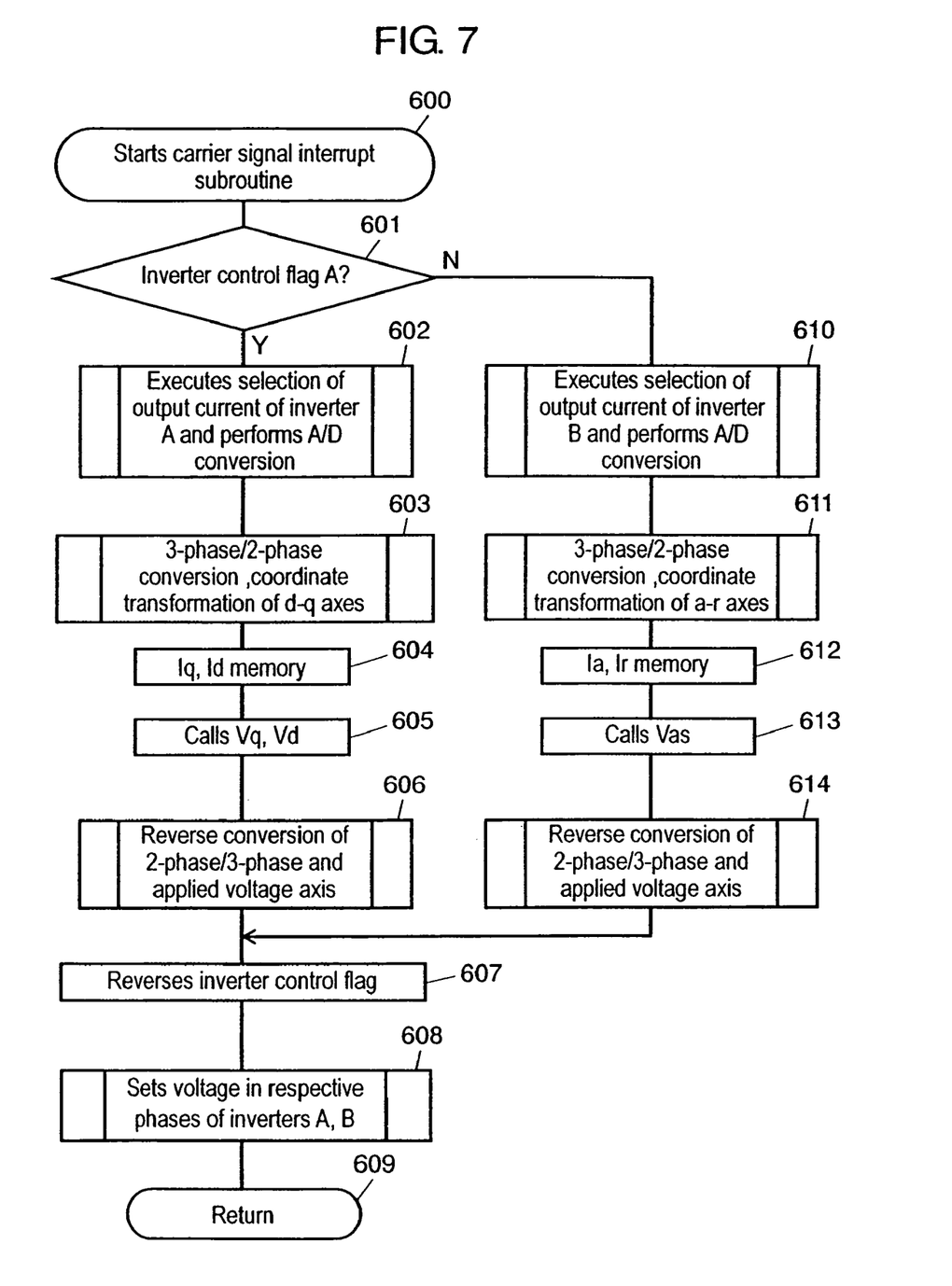
FIG. 7 is a flow chart for performing detection of current and vector operation alternately with carrier signals by synchronizing a PWM control of inverter circuits to be driven at once in the motor drive unit in above.

FIG. 6 indicates a timing chart of PWM period and current detection timing of the respective inverter circuits in the preferred embodiment 2, and FIG. 7 shows a flow chart for performing detection of current and vector operation alternately with carrier signals by synchronizing the PWM control of inverter circuits to be driven at once. In FIG. 6 and FIG. 7, first inverter circuit 3A and second inverter circuit 3B are identical in PWM period, and perform timing of detection of current by current detectors 5A, 5B alternately. Other configuration is the same as that in the first preferred embodiment and, therefore, explanation on it will be omitted by putting the same reference numbers.

Here, explanation will be made, by using FIG. 7, on the flow of performing detection of current and vector operation alternately with carrier signals by synchronizing the PWM control of inverter circuits to be driven at once.

In FIG. 7, a carrier signal interrupt signal is produced at the peak of a triangular wave, and a carrier signal interrupt subroutine starts in step 600. In step 601, the controller discriminates the control flag of first inverter circuit 3A and second inverter circuit 3B and, in the case where the control flag of first inverter circuit 3A is given, passes to step 602, to execute detection of current and A/D conversion of first inverter circuit 3A, and then passes to step 603 to perform 3-phase/2-phase conversion and d-q frame transformation, and determines d-axis current Id and q-axis current Iq. Next, the controller passes to step 604, to store Id, Iq in a memory. Determined d-axis current Id and q-axis current Iq are used in the main flow of motor control, and a signal of the difference between Iq and predetermined value Iqs is detected in the main flow, to operate q-axis voltage command value Vq. Next, the controller passes to step 605, to call out q-axis voltage command value Vq and d-axis voltage command value Vd, and performs inverse transformation in step 606, to determine respective phase voltages Vu, Vv, Vw of first inverter circuit 3A. Next, the controller passes to step 607, to invert the inverter circuit control flag and, at the next carrier signal interrupt, sets detection of current and vector operation of second inverter circuit 3B, and passes to step 608 to set PWM control set voltage corresponding to the phase of the voltage in respective phases of first inverter circuit 3A and second inverter circuit 3B on output voltage setting section 613, and passes to step 609 to return the subroutine.

In the case where the inverter circuit control flag is set for B, the controller passes to step 610, to control second inverter circuit 3B with a flow about the same as the flow explained in inverter circuit 3A. For the control of fan motor 4B, submitted to Sensorless sinusoidal wave drive using reactive current constant control method, the controller executes detection of current and A/D conversion of second inverter circuit 3B in step 610, and passes to step 611, to perform 3-phase/2-phase conversion and coordinate transformation to applied voltage axis (a-r frame), operates active current component Ia and reactive current component Ir, and stores Ia, Ir in step 612. In the main flow, the controller detects an error signal between reactive current component Ir and predetermined value Irs to perform proportional integral control of applied voltage Va. Next, the controller passes to step 613, to call out applied voltage set value Vas determined in the main flow, performs inverse transformation in step 614 to compute applied voltage in each of 3 phases, passes to step 607 to reverse the inverter control flag, and passes to step 608.

Even if the output current of a plurality of inverter circuits is detected simultaneously in one carrier, it takes much time for the vector operation such as coordinate transformation, etc. after the detection of current and, for that reason, the tasks of the processor increase, producing a possibility that the vector operation of a plurality of inverter circuits may not be completed in one carrier. From that point of view, if the detection of current is made alternately with the respective carriers, as in this preferred embodiment 2 described above, it becomes possible to detect the current within the lower limit value of continuity time of the lower arm transistor, even in the case of slow A/D conversion speed or long current detecting time in one carrier. Moreover, by performing detection of current and coordinate transformation of one inverter circuit in one carrier, it becomes possible to lessen the tasks of the processor, thus reducing the task volume of motor control.

Furthermore, this second preferred embodiment has a characteristic of reducing the problem that the task is not completed in one carrier with an increase of motor control task, compared with FIG. 3 in the first preferred embodiment, by assigning detection of current and coordinate transformation in-one carrier, even if the number of inverter circuits to be controlled at once increased to no less than 3, thus enabling to increase the number of inverter circuits without increasing the number of A/D conversion circuits which occupy a large surface area of the chip, by simply increasing the number of choices of PWM controller and multiplexer.

Preferred Embodiment 3

Figure 8:
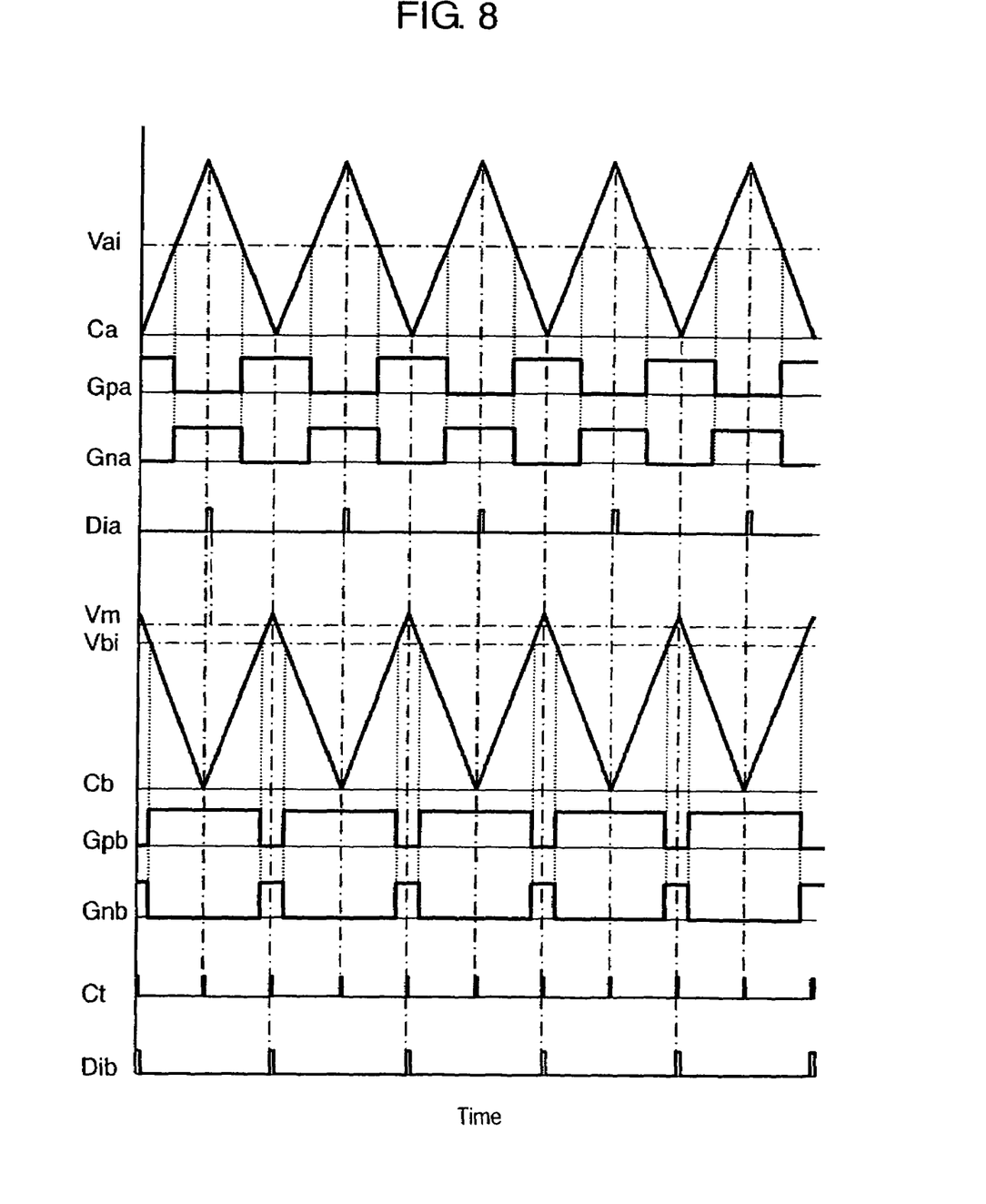
FIG. 8 is a timing chart of PWM period and current detection timing of the respective inverter circuits of the motor drive unit in a preferred embodiment 3 of the present invention.

FIG. 8 indicates a timing chart of PWM period and current detection timing of the respective inverter circuits in the third preferred embodiment. FIG. 8 shows a timing of detection of current in the case where first inverter circuit 3A and second inverter circuit 3B are identical in PWM period, and that their PWM periods are shifted by 180 degree from each other. Other configuration is the same as that in the first preferred embodiment and, therefore, explanation on it will be omitted by putting the same reference numbers.

By equalizing the count-up time and the count-down time of triangular wave carrier signals, it becomes possible to realize a phase shift of 180 degree easily, enabling PWM control with 180 degree phase shift. During continuity of the lower arm transistor of first inverter circuit 3A (Gna high), continuity is established in the upper arm transistor of second inverter circuit 3B (Gpb high), while, during continuity of the lower arm transistor of second inverter circuit 3B (Gnb high), continuity is established in the upper arm transistor of first inverter circuit 3A (Gpa high), thus enabling to detect the current alternately during the period when no switching noise is produced.

By shifting the carrier period as shown in FIG. 8, it becomes possible to execute A/D conversion individually with each inverter, reduce the minimum value of PWM width by A/D conversion time in the same way as with the method indicated in FIG. 7 of the second preferred embodiment, and shorten the current detection period in the same way as with the method indicated in FIG. 3 of the first preferred embodiment, thus demonstrating a characteristic of increasing the control speed, although this involves an increase of the task of vector operation.

Preferred Embodiment 4

Figure 9:
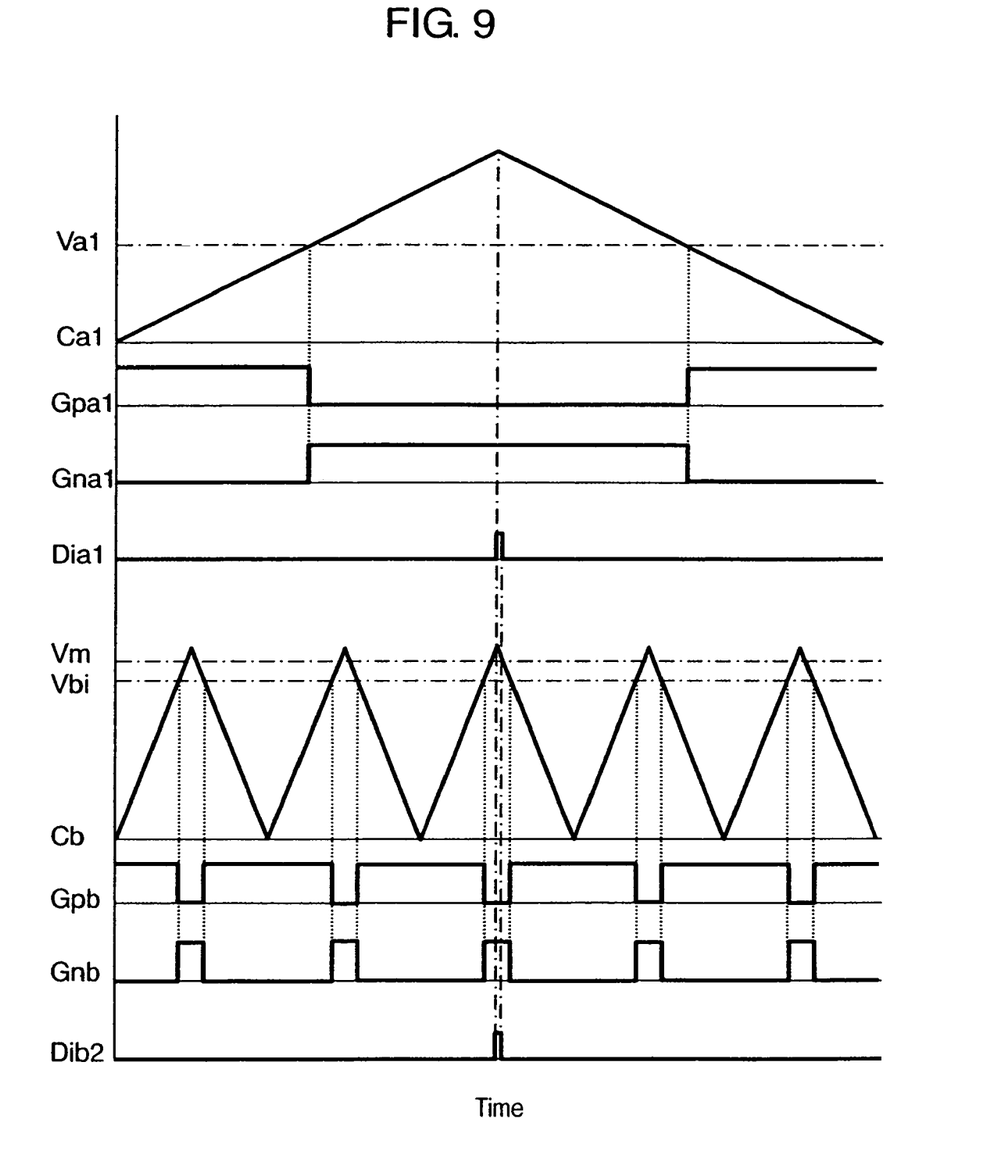
FIG. 9 is a timing chart of PWM period and current detection timing of the respective inverter circuits of the motor drive unit in a preferred embodiment 4 of the present invention.

FIG. 9 indicates a timing chart of PWM period and current detection timing of the respective inverter circuits in the fourth preferred embodiment. In FIG. 9, in which the PWM period of first inverter circuit 3A is an odd multiple of the PWM period of second inverter circuit 3B, shows the waveform in each of A/D converter 60 and first PWM controller 61A and second PWM controller 61B. Other configuration is the same as that in the first preferred embodiment and, therefore, explanation on it will be omitted by putting the same reference numbers.

The PWM period of first inverter circuit 3A indicates a case where synchronization is made at a period just 5 times higher than that of second inverter circuit 3B. In the case where the respective carrier signals are triangular waves, the period becomes a period of an odd multiple when A/D conversion is made at the peak of a triangular wave by synchronizing the trough of triangular wave.

The A/D converter enables the processor to detect motor current without switching noise interference, if synchronization is made at the peak of triangular wave of carrier signal Cal.

Preferred Embodiment 5

Figure 10:
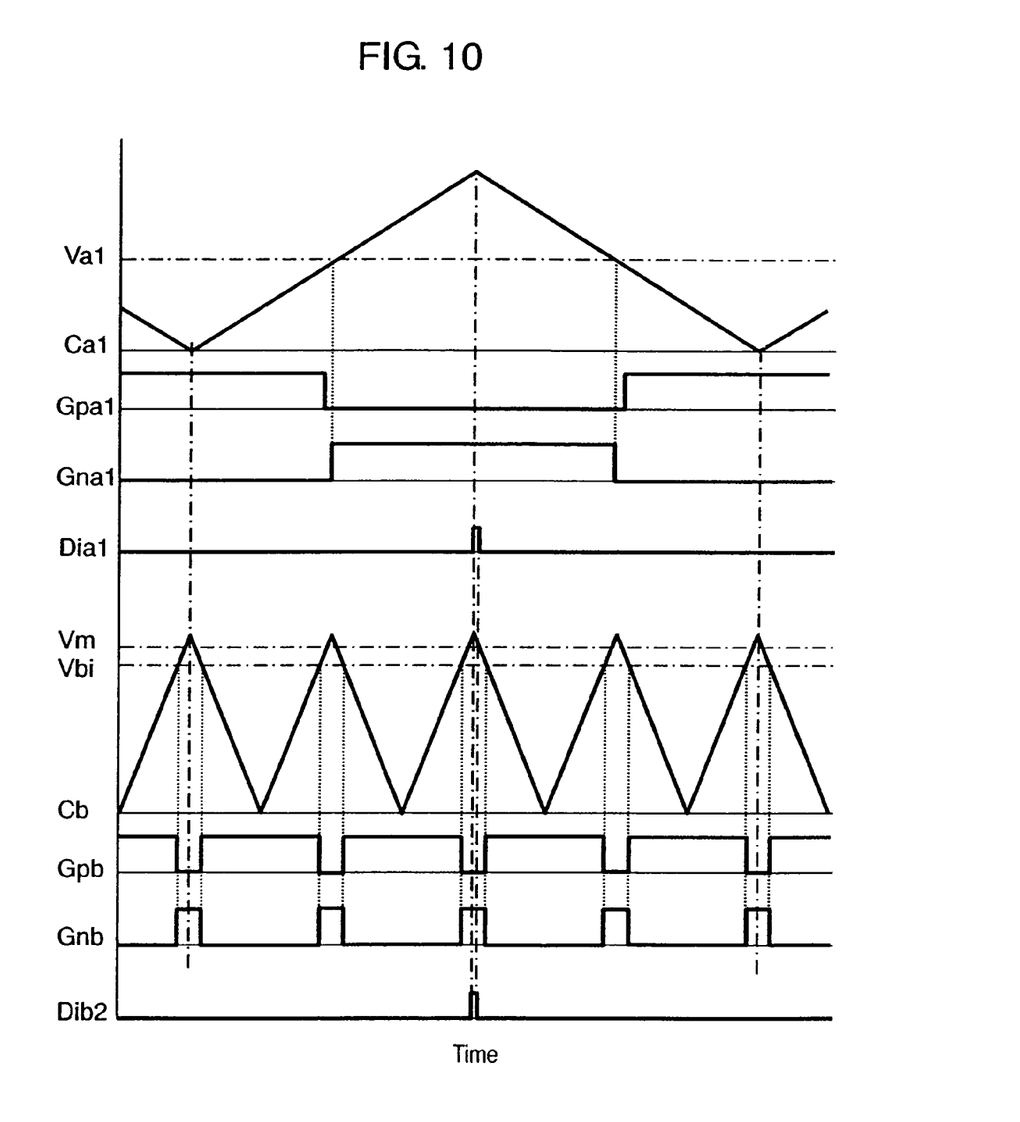
FIG. 10 is a timing chart of PWM period and current detection timing of the respective inverter circuits of the motor drive unit in a preferred embodiment 5 of the present invention.

FIG. 10 indicates a timing chart of PWM period and current detection timing of the respective inverter circuits in the fifth preferred embodiment. In FIG. 10, the PWM period of first inverter circuit 3A is an even multiple of the PWM period of second inverter circuit 3B, and the period ratio of carrier signal Cal to carrier signal Cb is just 4:1. Other configuration is the same as that in the first preferred embodiment and, therefore, explanation on it will be omitted by putting the same reference numbers.

It can be seen that, in the case of an even multiple, there is a need of synchronization at the peak and trough of the carrier signals. Either odd number or even number may be realizable, depending on the way of synchronization.

Preferred Embodiment 6

Figure 11:
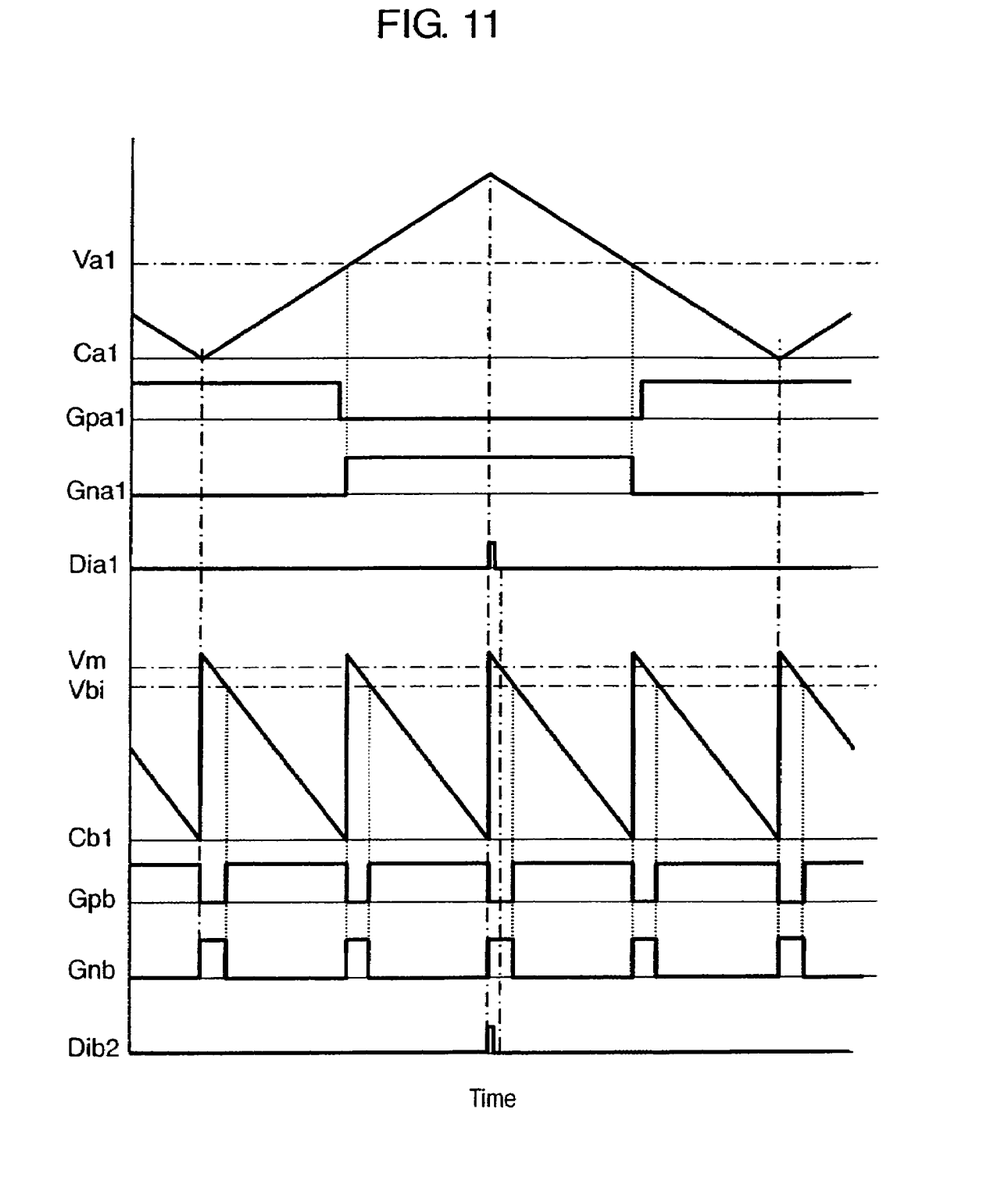
FIG. 11 is a timing chart of PWM period and current detection timing of the respective inverter circuits of the motor drive unit in a preferred embodiment 6 of the present invention.

FIG. 11 indicates a timing chart of PWM period and current detection timing of the respective inverter circuits in the sixth preferred embodiment. In FIG. 11, the carrier signal of second inverter circuit 3B is given in saw-tooth wave. Other configuration is the same as that in the first preferred embodiment and, therefore, explanation on it will be omitted by putting the same reference numbers.

In the case where at least the carrier signal on one side is given in saw-tooth wave, the timing of synchronization of carrier signal Cal and carrier signal Cbl is peak to peak in the case of an even number, but center value to center value of ramp (not illustrated) in the case of an odd number. Although not illustrated, if a plurality of carrier signals are all given in saw-tooth wave, the timing of synchronization becomes very simple because it has nothing to do with odd number or even number. However, in the case where carrier signals are given in saw-tooth wave, harmonics increase under the influence of the side band of output current waveform when the carrier frequency is low and, for that reason, the carrier signal on the side of higher carrier frequency is set in saw-tooth wave of ultrasonic wave and the carrier signal on the side of lower carrier frequency is set in triangular wave as shown in FIG. 11, thereby enabling to reduce noise. If a plurality of carrier signals are all given in saw-tooth wave, as shown in FIG. 9 of the fourth preferred embodiment or FIG. 10 of the fifth preferred embodiment, the noise can be reduced best.

According to the present invention, which can drive a plurality of inverter circuits and a plurality of motors at once with a single controller and can perform either vector control or Sensorless sinusoidal wave drive of at least one motor, it becomes possible to realize improvement of reliability and inexpensive motor drive unit, by reducing the motor vibration noise and eliminating position sensor.

Preferred Embodiment 7

Figure 12:
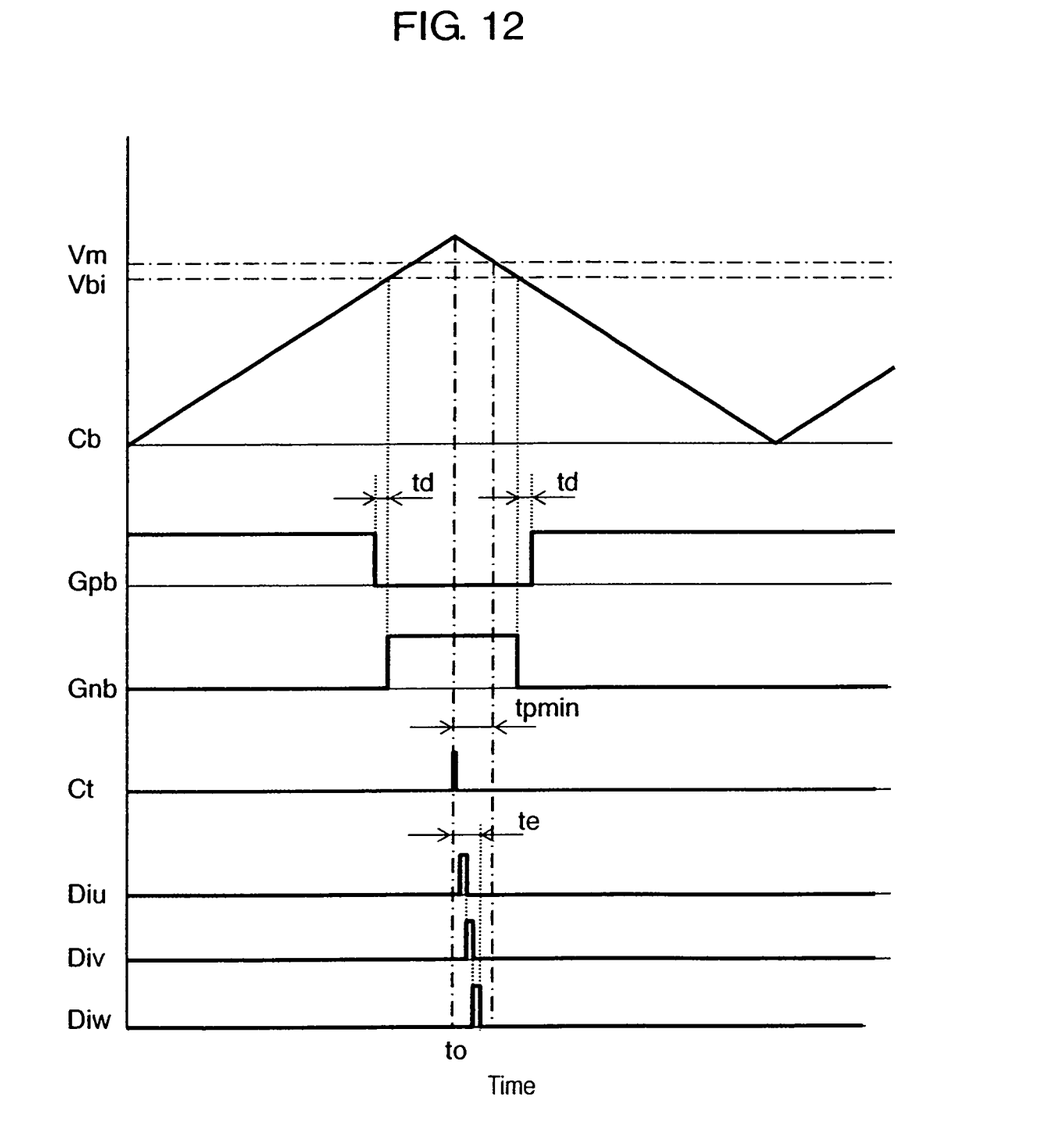
FIG. 12 is a timing chart of the A/D conversion circuit of the motor drive unit in a preferred embodiment 7 of the present invention.

FIG. 12 indicates a timing chart of A/D conversion circuit in the seventh preferred embodiment. In FIG. 12, one A/D conversion circuit performs A/D conversion circuit of a plurality of signals. Other configuration is the same as that in the first preferred embodiment and, therefore, explanation on it will be omitted by putting the same reference numbers. Low period td is a dead time for both upper arm gate signal Gpb and lower arm gate signal Gnb, and is a period protected against short-circuiting by simultaneous continuity of the upper and lower arms. The controller generates A/D conversion starting signal Ct at the timing when carrier signal Cb is at the peak, and performs A/D conversion of output signals Vsua, Vsva, Vswa in cascade in the order of Diu, Div, and Diw by using one A/D conversion circuit starting from time to, to make it work as if there were 3 A/D conversion circuits. The minimum value of continuity period of the lower arm is limited by upper limit set value Vm of output voltage, and is not subject to any influence of switching noise if only high-speed A/D conversion is made in such a way that A/D conversion time te may be smaller than tpmin.

As described above, according to these preferred embodiments 1 to 7, which designed to synchronize the PWM period of a plurality of inverter circuits operating at once and detect the current during an ON or OFF period when no switching noise of transistor is induced from any of the plurality of inverter circuits, it becomes possible to eliminate switching noise interference at the detection of current and perform detection of current by shunt resistors system, thus enabling to perform vector control or position Sensorless sinusoidal wave drive of at least one of the plurality of inverter circuits to be driven simultaneously. Furthermore, it is also possible to perform vector control or position Sensorless sinusoidal wave drive of a plurality of inverter circuits at once, or perform position Sensorless sinusoidal wave drive of washing spinning tank drive motor and drying blow fan motor of a washer-dryer, or heat pump compressor motor and cooling fan drive motor of an air conditioner at once with a single processor, thus achieving an inexpensive motor drive unit with high performance and high efficiency.

What is claimed is:

1. A motor drive unit for use with a DC power source, the motor drive unit comprising:
   a plurality of inverter circuits configured to convert DC power of the DC power source to AC power;
   a current detector configured to detect an output current of at least one of the plurality of inverter circuits, the current detector including a plurality of shunt transistors connected respectively to the emitter terminals of a lower arm transistor of the at least one inverter circuit, and a level shift circuit connected to the plurality of shunt resistors, the level shift circuit configured to shift current signals of the plurality of shunt resistors or perform an amplification after level shifting of the plurality of shunt resistors; and
   a controller configured to perform PWM control of the plurality of inverter circuits,
   to synchronize a PWM period of the plurality of inverter circuits, and to drive a plurality of motors respectively at once by means of the plurality of inverter circuits.

2. The motor drive unit according to claim 1, wherein the controller performs control in such a way that the PWM period of the plurality of inverter circuits may be identical.

3. The motor drive unit according to claim 1, wherein the controller performs control in such a way that a ratio of PWM period of the plurality of inverter circuits may be an integral multiple.

4. The motor drive unit according to claim 1, wherein the controller comprises an A/D converter for performing A/D conversion of an output signal of the current detector, and a plurality of PWM controllers for performing PWM control of the plurality of inverter circuits respectively, the A/D converter performing A/D conversion in synchronization with the PWM period.

5. The motor drive unit according to claim 4, wherein the PWM controller comprises a carrier signal generator, an output voltage setting section, and a comparator, and performs A/D conversion by synchronizing a period of the carrier signal generator.

6. The motor drive unit according to claim 4, wherein the A/D converter performs A/D conversion at once or alternately in synchronization with the PWM period of the plurality of PWM controllers.

7. The motor drive unit according to claim 1, wherein the controller performs at least one of a vector control and a Sensorless sinusoidal wave drive of at least one inverter circuit among the plurality of inverter circuits.

8. A motor drive unit for use with a DC power source, the motor drive unit comprising:
   a DC power source;
   a plurality of inverter circuits configured to convert DC power of the DC power source to AC power;
   a current detector configured to detect an output current of the plurality of inverter circuits; and
   a controller configured to (1) perform PWM control of the plurality of inverter circuits, (2) synchronize a PWM period of the plurality of inverter circuits, (3) drive a plurality of motors respectively at once by means of the plurality of inverter circuits and (4) sample the output current detected by each respective one of the plurality of inverter circuits during different synchronized PWM periods.

9. A motor drive unit for use with a DC power source, the motor drive unit comprising:
   a plurality of inverter circuits configured to convert DC power of the DC power source to AC power;
   a current detector configured to detect an output current of at least one of the plurality of inverter circuits; and
   a controller configured to generate a respective PWM signal to drive each of the plurality of inverter circuits, periods of each of the PWM signals being integer multiples of each other.

* * * * *